(12) United States Patent
Minemura (10) Patent No.: US 7,242,277 B2
(45) Date of Patent: Jul. 10, 2007

(54) INDIVIDUAL AUTHENTICATION DEVICE AND CELLULAR TERMINAL APPARATUS

(75) Inventor: Atsushi Minemura, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 80 days.

(21) Appl. No.: 10/469,242

(22) PCT Filed: Mar. 11, 2003

(86) PCT No.: PCT/JP03/02831

§ 371 (c)(1),
(2), (4) Date: Sep. 5, 2003

(87) PCT Pub. No.: WO03/079291

PCT Pub. Date: Sep. 25, 2003

(65) Prior Publication Data

US 2004/0085188 A1    May 6, 2004

(30) Foreign Application Priority Data

Mar. 15, 2002    (JP)    .............. 2002-72670

(51) Int. Cl.
G06F 21/00 (2006.01)
G06F 7/04 (2006.01)
G08B 29/00 (2006.01)
G06K 9/00 (2006.01)

(52) U.S. Cl. .............. 340/5.53; 340/5.82; 340/5.83

(58) Field of Classification Search .............. 340/5.53, 340/5.82, 5.83, 133, 5.52; 382/124; 713/186, 713/202

See application file for complete search history.

(56) References Cited

U.S. PATENT DOCUMENTS

| 5,623,552 | A  | * | 4/1997  | Lane .................... 340/5.83 |
| 5,903,225 | A  | * | 5/1999  | Schmitt et al. .......... 340/5.53 |
| 6,141,436 | A  | * | 10/2000 | Srey et al. ............. 340/5.74 |
| 6,466,781 | B1 | * | 10/2002 | Bromba et al. .......... 340/5.82 |
| 6,484,260 | B1 | * | 11/2002 | Scott et al. ............ 713/186 |
| 6,547,130 | B1 | * | 4/2003  | Shen ................... 382/115 |
| 7,003,495 | B1 | * | 2/2006  | Burger et al. .......... 713/172 |
| 2002/0073340 | A1 | * | 6/2002 | Mambakkam et al. ..... 382/115 |
| 2002/0118865 | A1 | * | 8/2002 | Hosokawa .............. 340/5.53 |
| 2003/0048904 | A1 | * | 3/2003 | Wang et al. ........... 713/185 |

(Continued)

FOREIGN PATENT DOCUMENTS

JP    10-149446    6/1998

(Continued)

OTHER PUBLICATIONS

U.S. Appl. No. 60/305,120 filed on Jul. 12, 2001.*

(Continued)

*Primary Examiner*—Brian Zimmerman
*Assistant Examiner*—Clara Yang
(74) *Attorney, Agent, or Firm*—Greenblum & Bernstein, P.L.C.

(57) ABSTRACT

A personal authentication device can perform a fingerprint authentication processing by simple operation steps. The personal authentication device is installed in a slot of a portable phone. Approval authentication is carried out for a person who presses a button installed in a fingerprint sensor of the personal authentication device. Transaction data output from the personal authentication device is transmitted using an external communication module of the portable phone.

13 Claims, 8 Drawing Sheets

U.S. PATENT DOCUMENTS

2003/0115490 A1* 6/2003 Russo et al. ................ 382/115
2003/0149662 A1* 8/2003 Shore .......................... 705/39

FOREIGN PATENT DOCUMENTS

| JP | 11-272349 | 10/1999 |
| JP | 2000-57324 | 2/2000 |
| JP | 2000-76412 | 3/2000 |
| JP | 2001-92554 | 4/2001 |
| JP | 2002-024812 | 1/2002 |
| JP | 2002-24812 | 1/2002 |
| KR | 2002-011052 | 2/2002 |

OTHER PUBLICATIONS

English Language Abstract of JP 2002-24812.
English Language Abstract of JP 2000-76412.
English Language Abstract of JP 2000-57324.
English Language Abstract of JP 10-149446.
English Language Abstract of JP 11-272349.
English Language Abstract of JP 2001-92554.
English Language Abstract of KR 2002-011052.
English Language Abstract of JP 2002-024812.

* cited by examiner

| TRANSACTION DATA LENGTH | TRANSACTION DATA | SIGNATURE BY FINGERPRINT AUTHENTICATION TRM |

[DATA CONFIGURATION]

INDIVIDUAL AUTHENTICATION DEVICE AND CELLULAR TERMINAL APPARATUS

TECHNICAL FIELD

The present invention relates to a personal authentication device used, for instance, in a commercial transaction, and to a portable terminal apparatus that comprises such device and performs transactions of various types of services.

BACKGROUND ART

Recently, the use of credit card instead of cash money to complete commercial transactions over a computer network employing Electronic Commerce (EC) is remarkably increased, and mobile EC that uses mobile terminals such as portable phone also starts spreading.

In a commercial transaction, it becomes necessary to perform ① personal authentication, ② approval of personal authentication, and ③ transmission of transaction data.

The steps of acquiring inputs of Personal Identifier Number (PIN) such as secret number, password, collating input PIN with data that is registered previously, carrying out personal authentication (①) and approval of personal authentication (②), and transmitting transaction data such as credit card number, expiration date (③), are performed in present transaction system. However, ① and ② are performed simultaneously when a user inputs the PIN information.

Moreover, recently, the technology of biometric authentication that utilizes the user's biological features such as fingerprint, iris and voice is gaining great attention as means for personal authentication, and computers that have user authentication functions by means of fingerprint and enter/leave access control systems that perform personal authentication by fingerprint are in practical use.

Transaction system using PIN for authentication cannot identify a particular person as such PIN can be input by another person, it is difficult to avoid the possibility of performing "counter feinting". Thus, user has to care about others' eyes when inputting PIN information.

Fingerprint authentication avoids "counter feinting", and increase possibility of safe transaction. However, when fingerprint authentication technology is applied in a mobile EC terminal, for instant, the operations of turning on the power to initiate fingerprint authentication application, extracting fingerprint for personal authentication, pressing a button for authentication approval, and transmission transaction data are complicated compared with PIN input operations.

To simplify these operations, fingerprint authentication application is initiated in advance, but the problem of increasing power consumption may be raised. Decreasing power consumption becomes an indispensable matter, specially, in portable tools such as portable phones/PDA, etc. To decrease power consumption, it is important to delay the processing of initiating fingerprint authentication application until such processing becomes necessary.

Although the fingerprint is read out through a sensor and fingerprint collation data is subjected to collation in fingerprint authentication processing, there is a risk that this fingerprint collation data might be revealed by hacking.

Even if transaction data and personal authentication processing are succeeded, similar risk still might occur during transmission.

DISCLOSURE OF INVENTION

It is an object of the present invention to provide a personal authentication device that performs a simple fingerprint authentication processing, and to provide a portable terminal apparatus that comprises such a device.

A personal authentication device according to one embodiment of the present invention comprising functions for performing personal authentication processing of an operator using biological features of the operator when an operation is initiated in an operation section, and approving authentication processing in response to the operation.

A personal authentication device according to another embodiment of the present invention comprising functions for performing personal authentication processing of an operator using a fingerprint of an operator finger that presses an operational button, and approving authentication processing in response to the action of pressing the operational button.

A personal authentication device according to another embodiment of the present invention comprising: a switch, a fingerprint sensor, a tamper resistant module (TRM), a switch power supply element to supply power to said switch from an external section of the device, a sensor power supply element to supply power to the fingerprint sensor from the switch, and a TRM power supply element to supply power to tamper resistant module from the switch, wherein tamper resistant module comprises a fingerprint authentication processor, a fingerprint collation data storing section, and a confidential information storing section.

A personal authentication device having a tamper resistant module according to another embodiment of the present invention comprising: a switch, a fingerprint sensor, a fingerprint authentication processor, a fingerprint collation data storing section, a confidential information storing section, a switch power supply element to supply power to the switch from an external section of the device, and a sensor power supply element to supply power to the fingerprint sensor from the switch.

A portable terminal apparatus having personal authentication device according to another embodiment of the present invention comprising a communication section to transmit data output from the personal authentication device to external section.

BEST MODE FOR CARRYING OUT THE INVENTION

Hereafter, an embodiment of the present invention will be specifically described with reference to the accompanying drawings. In addition, the present invention is not limited to this embodiment and any other embodiments can be applied to this invention without deviation from the invention scope.

In the present embodiment, the case of using personal authentication device in a commercial transaction will be explained below.

Figure 1:
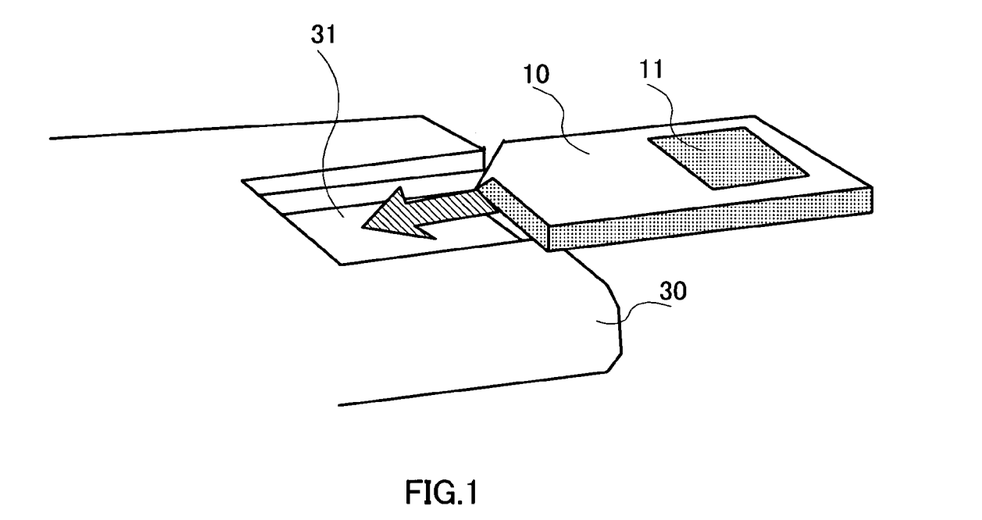
FIG. 1 is a diagram showing a case where a portable phone comprising a personal authentication device according to an embodiment of the present invention.
Figure 2A:
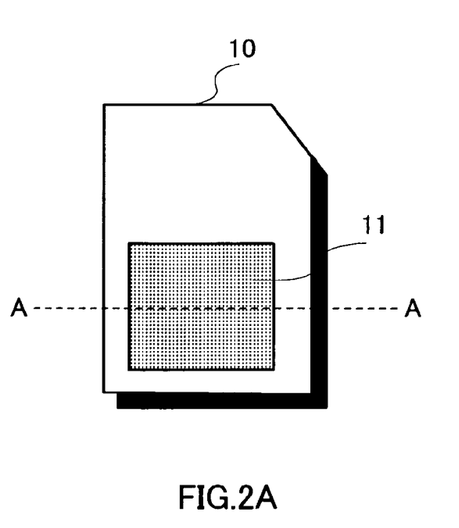
FIG. 2A is a diagram showing front side of the personal authentication device according to an embodiment of the present invention.
Figure 2B:
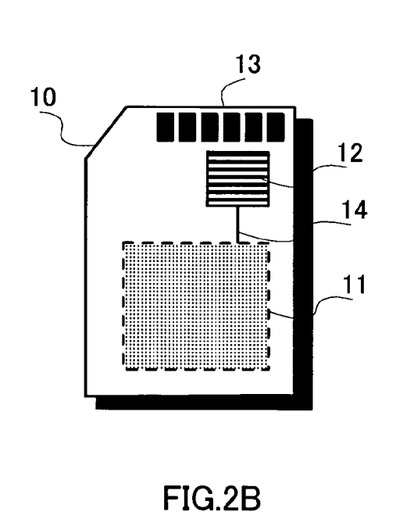
FIG. 2B is a diagram showing back side of the personal authentication device according to an embodiment of the present invention.
Figure 3:
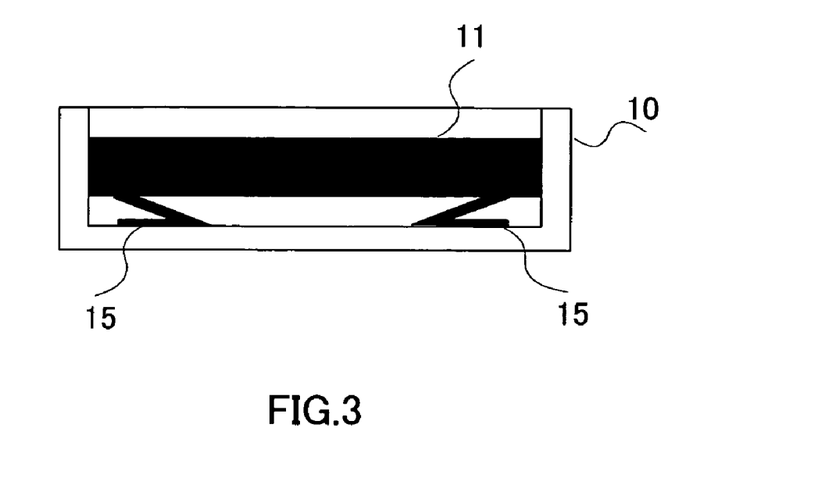
FIG. 3 is a diagram showing cross sectional side of personal authentication device according to an embodiment of the present invention.

Personal authentication device 10, as shown in FIG. 1, has a card shape mounted in slot 31 that is set in upper part of the back side of portable phone 30. FIG. 2A shows the front side, FIG. 2B shows the back side, and FIG. 3 shows a cross sectional view A-A in FIG. 2A of device 10. In addition, elements (11, 12, and 14) have not to be bared.

Fingerprint authentication sensor 11 which services as a switch button is set in front side of device 10, while the back side comprises an IC chip of tamper resistant module (TRM) 12, external interface (I/F) 13 to contact the connection terminal side of portable phone 30 when device 10 is mounted in portable phone 30, and bus circuit 14 to connect fingerprint authentication sensor 11 to TRM 12.

Figure 4:
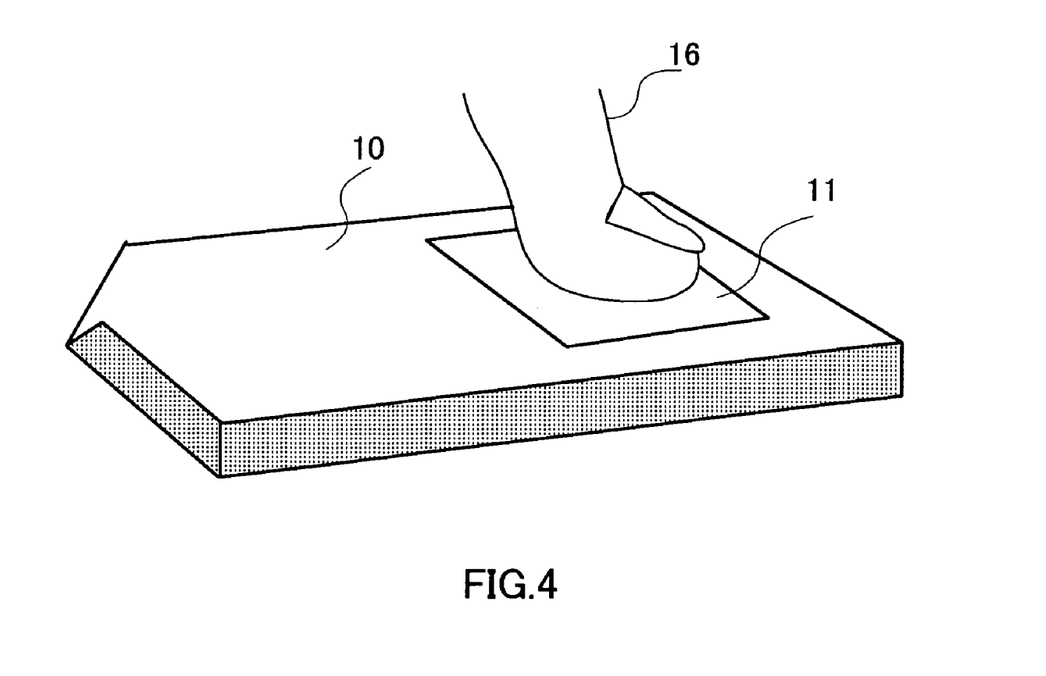
FIG. 4 is a diagram showing an operational state of personal authentication device according to an embodiment of the present invention.

Fingerprint authentication sensor 11 is elastically supported using spring as a push button type switch 15, and as shown in FIG. 4, since physical pressure is added when finger 16 presses on front side of fingerprint authentication sensor 11, push button type switch 15 turns on and the fingerprint of finger 16 is detected.

Figure 5:
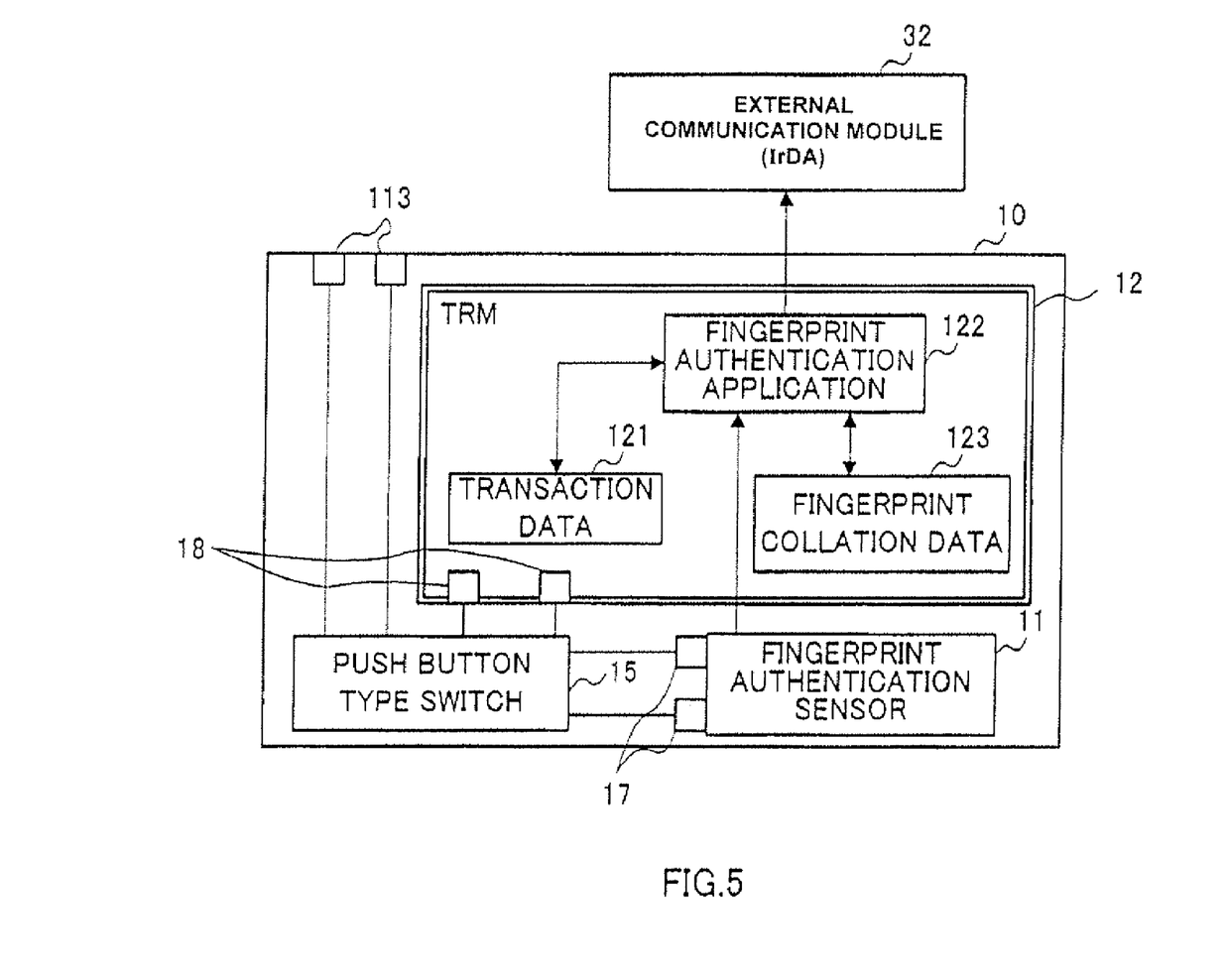
FIG. 5 is a block diagram showing a configuration of a personal authentication device according to an embodiment of the present invention.

FIG. 5 is a block diagram showing a configuration of personal authentication device 10.

TRM 12 stores transaction data 121 such as credit card number, fingerprint collation data 123, and fingerprint authentication application 122 to perform fingerprint authentication processing. Transaction data 121 might be credit card number, expiration date and secret number, or account number and secret number.

In addition, when a finger presses fingerprint authentication sensor 11, adds physical pressure and turns on a push button type switch 15, the power provided from portable phone through power supply terminals 113 is supplied to fingerprint authentication sensor 11 via terminals 17, and further supplied to TRM 12 via terminals 18.

External communication module 32 of Infrared Data Association (IrDA) of portable phone 30 transmits the data output from TRM 12.

Figure 6:
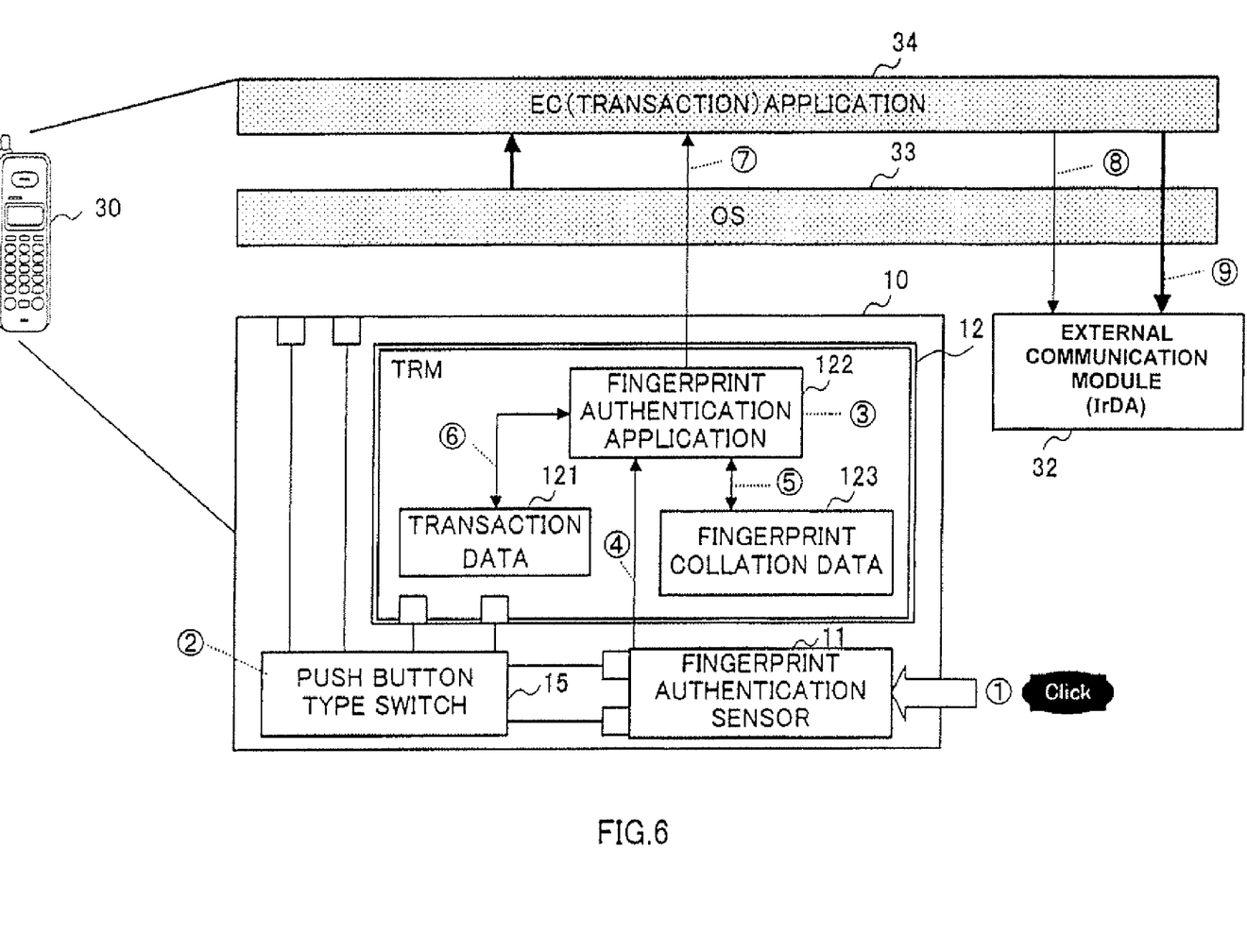
FIG. 6 is a block diagram showing operational procedures of personal authentication device according to an embodiment of the present invention.

FIG. 6 shows operational procedures when a user presses fingerprint authentication sensor 11 of personal authentication device 10.

Beside the internal configuration shown in FIG. 6, portable phone 30 comprises external communication module 32, OS 33, and EC (transaction) application 34.

When a user finger presses fingerprint authentication sensor 11 (①), turns on push button type switch 15, portable phone 30 supplies power to TRM 12 and fingerprint authentication sensor 11 (②), and fingerprint authentication sensor 11 detects the fingerprint of the user finger.

OS 33 of portable phone 30 detects a signal transmitted to personal authentication device 10, and initiates EC application 34.

Fingerprint authentication application 122 is automatically initiated when supplying power to TRM 12 (③). Fingerprint authentication application 122 acquires data detected from fingerprint authentication sensor 11 (④), when a user is authenticated after collation with fingerprint collation data 123 (⑤), fingerprint authentication application 122 extracts the necessary data from transaction data 121 (⑥), and transmits transaction data (or the data resulted from processing transaction data) and transmission instructions to EC application 34 (⑦).

Figure 7:
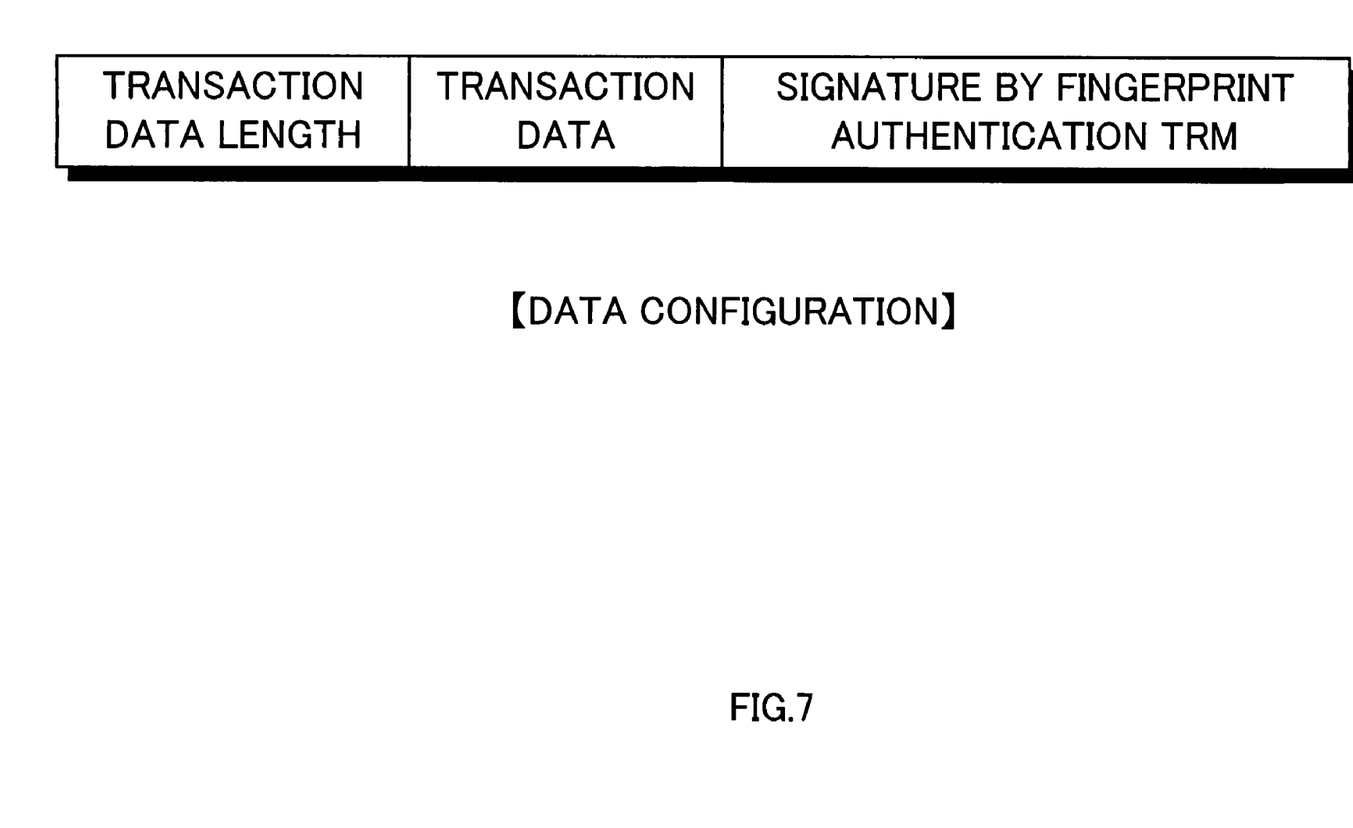
FIG. 7 is a diagram showing a configuration of transaction data transmitted from a personal authentication device according to an embodiment of the present invention.

FIG. 7 shows a configuration of transaction data transmitted from fingerprint authentication application 122 to EC application 34. The Data comprising transaction data length to show the length of transaction data, transaction data, and digital signature that is attached in TRM 12.

EC application 34 that receives transaction data along with transmission instructions turns on the power supply of external communication module 32 (⑧), and transmits transaction data outside through external communication module 32 (⑨). In addition, fingerprint authentication application 122 of (③) is initiated simultaneously or immediately after turning on power supply of external communication module 32 of (⑧).

External communication module 32 is activated to transmit transaction data only when a user presses fingerprint authentication sensor (button) 11.

Figure 8:
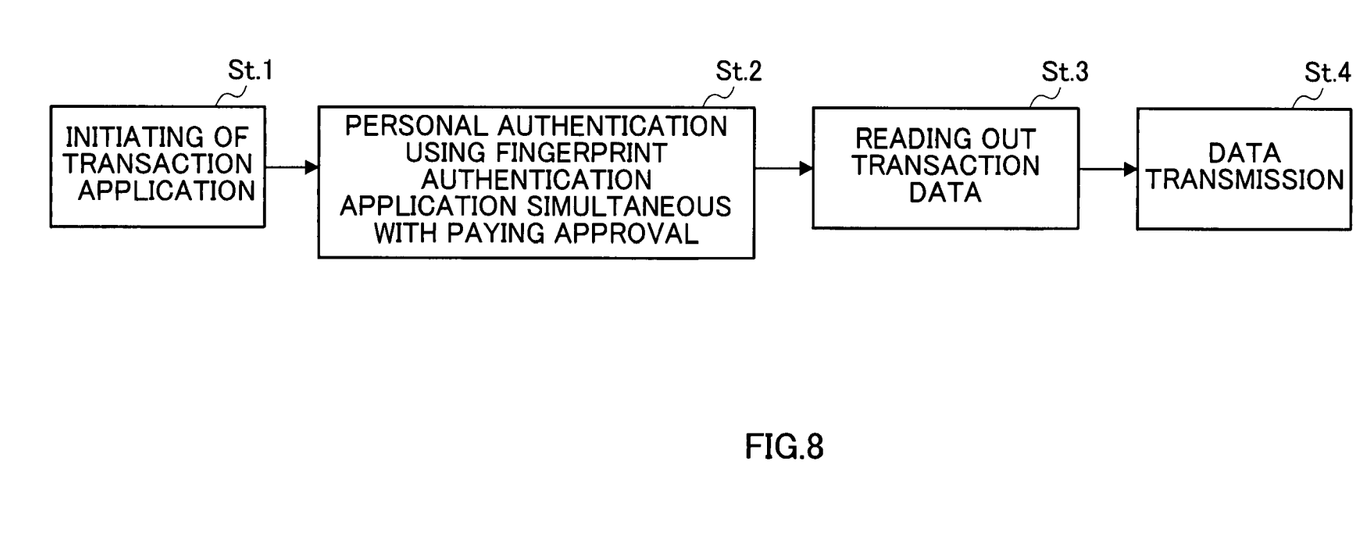
FIG. 8 is a diagram showing operational procedures flow of personal authentication device according to an embodiment of the present invention.

As shown in FIG. 8, when a user finger presses fingerprint authentication sensor 11 only one time, personal authentication device 10 initiates transaction application 34 of portable phone 30 (St.1), carries out approval of paying authentication in fingerprint authentication application 122 (St.2), extracts transaction data 121 (St.3), and transmits the data (St.4).

When adding physical pressure on fingerprint authentication sensor 11, push button type switch 15 is turned on to supply external power to personal authentication device 10 which in turn supplies fingerprint authentication sensor 11 and initiates fingerprint authentication application 122.

The initiated personal authentication device 10 transmits transaction data and transmission instruction, and upon the reception of the above, the power supply of external communication module 32 of portable phone 30 is turned on and transaction data is transmitted.

Since fingerprint authentication sensor 11, fingerprint authentication application 122, and external communication module 32 are initiated immediately before their use becomes necessary, it is possible to reduce power consumption.

Since transaction data 121 and fingerprint collation data 123 are protected inside TRM 12, there is no threat of external leakage. Moreover, the transaction data can be taken out of TRM 12 only upon successful personal authentication, so that there is no threat that the transaction data is read out by way of illegitimate access such as hacking.

Figure 9:
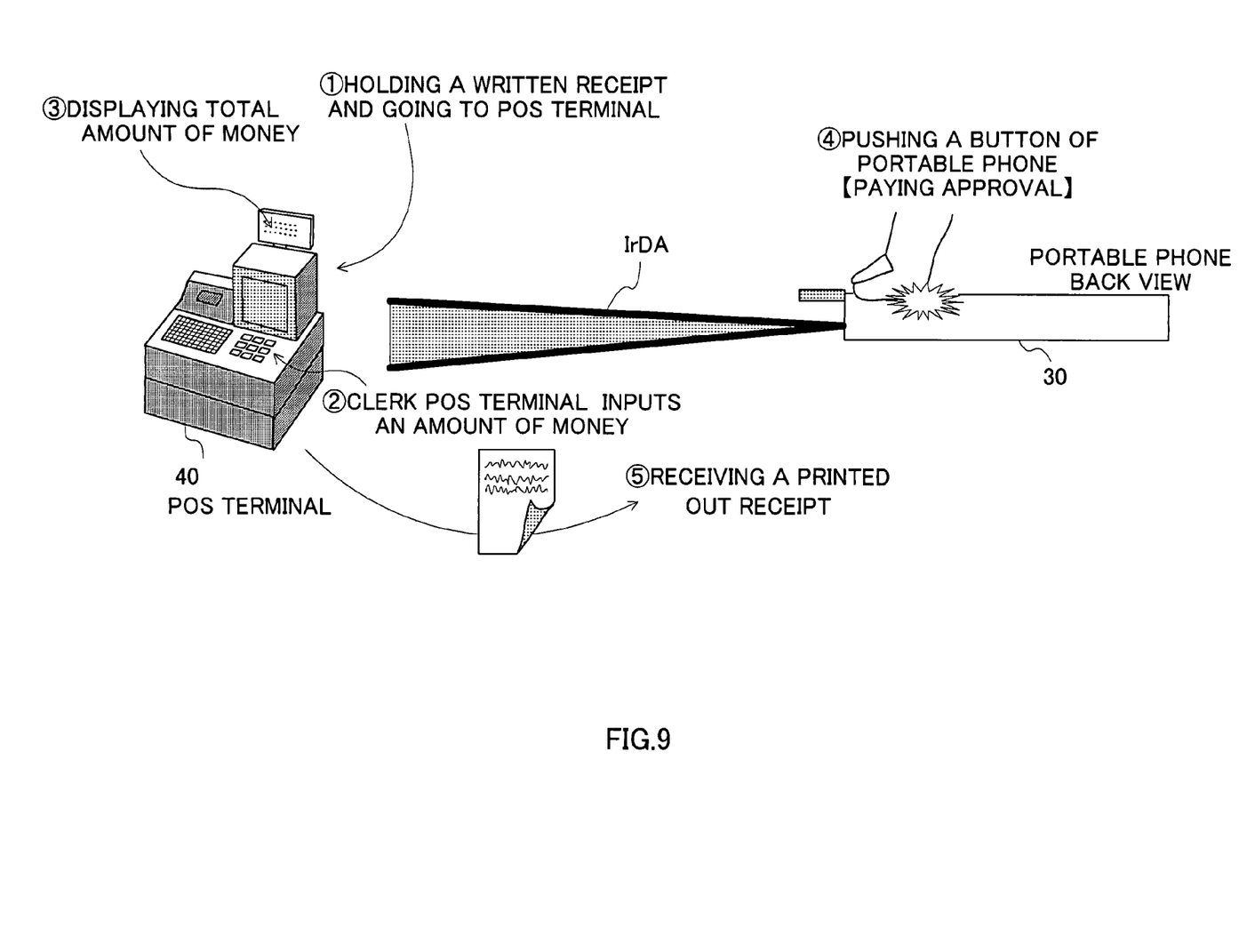
FIG. 9 is a diagram showing an applicable state of personal authentication device according to an embodiment of the present invention.

FIG. 9 shows one exemplary application form of portable phone 30 comprising personal authentication device, namely, the case of transmitting account number and secret number as a transaction data from portable phone 30 to Point Of Sales system (POS) terminal 40.

A user who had a meal at a restaurant holds a written receipt and goes to a register (①). When a clerk inputs an amount of money of the written receipt into POS terminal 40 (②), the total amount of money is displayed on a screen of POS terminal 40 (③). The user who approved payment of such total amount of money pushes, using his finger, fingerprint authentication sensor of personal authentication device 10 installed in portable phone 30 (④).

After completing the steps of personal authentication using personal authentication device 10, portable phone 30 transmits account number and secret number to POS terminal 40. POS terminal 40 performs transaction processing between transaction systems which are connected over a network, and prints a receipt after completing transaction processing. Finally, the register passes printed receipt to the user (⑤).

Thus, a conventional transaction system operation in which a magnetic reader reads out a credit card and a user inputs a secret number, is replaced by an operation that can be realized in a portable phone 30 comprising personal authentication device 10 in which a user pushes fingerprint authentication sensor 11 of personal authentication device 10 for one time.

Thus, it becomes unnecessary to worry whether others are watching the operation of inputting a secret number when using personal authentication device.

It is possible to install fingerprint authentication sensor 11, pushbutton type switch 15, and power supply terminal inside TRM 12.

Figure 10:
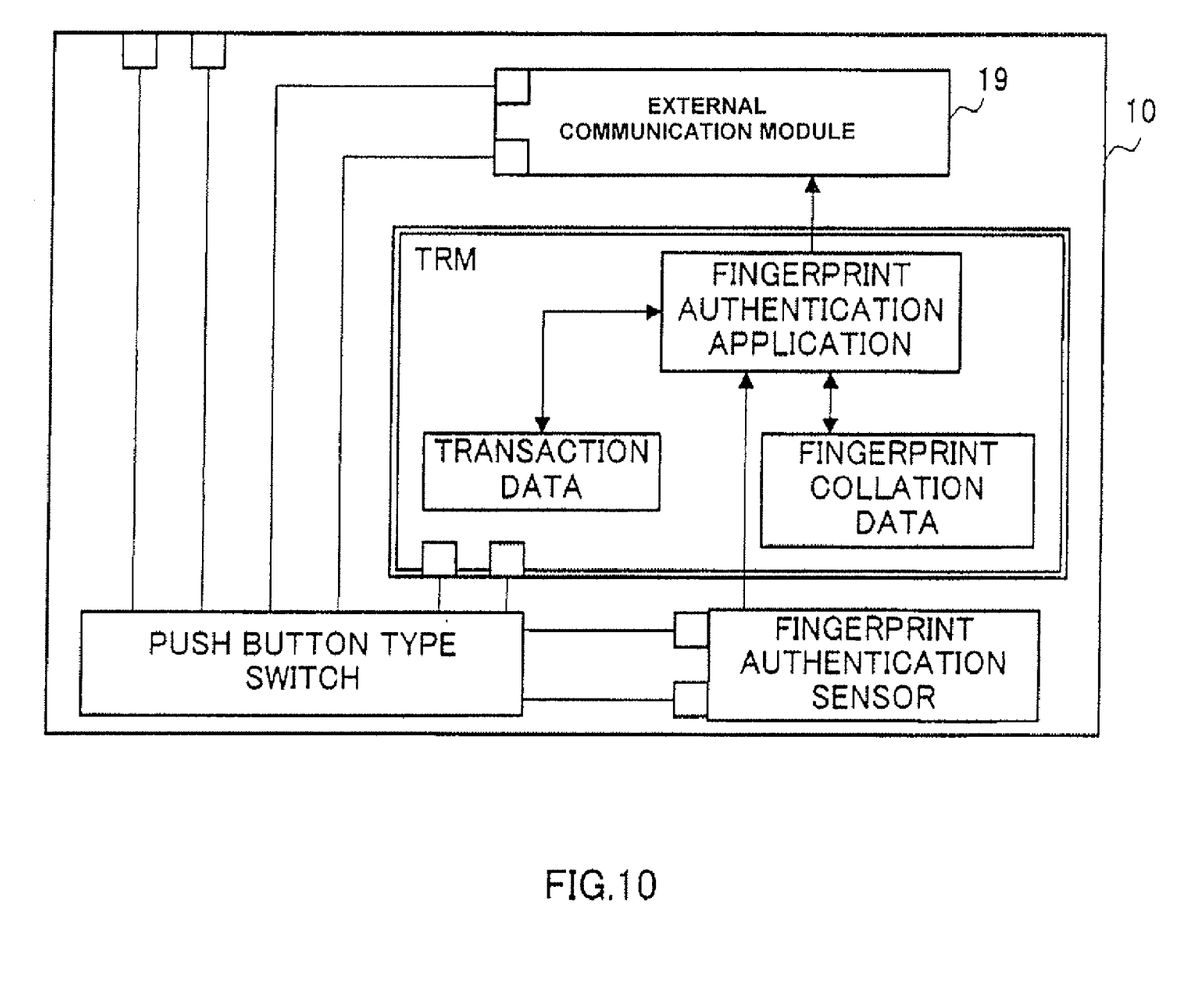
FIG. 10 is a block diagram showing a configuration of other personal authentication device according to an embodiment of the present invention.

As shown in FIG. 10, external communication module 19 is installed inside personal authentication device 10. External communication module might be installed inside TRM 12.

Communications in external communication module 32 and 19 can be carried out using Bluetooth communication or contactless IC card besides infrared radio communication.

Although the case where external communication module 32 of portable phone 30 transmits transaction data output from personal authentication device 10 over local communication was explained, but radio communication section of portable phone 30 can be used to transmit transaction data output from personal authentication device 10 over a network, and use commercial transaction in mobile EC which processes transaction over the network.

However, a mechanical exemplary composition of fingerprint authentication sensor 11 is given, as switch is turned on simultaneously with extracting fingerprint, but any other compositions are possible. The integrated composition of fingerprint authentication sensor 11 in TRM 12 might be a preferable composition as when fingerprint authentication sensor 11 is pressed, the switch is turned on.

Furthermore, in order to prevent personal authentication device 10 to mistakenly operate when a user touches unconsciously fingerprint authentication sensor 11, a possible composition is that personal authentication device 10 operates only when fingerprint authentication sensor 11 is continuously pressed for 2 seconds or more.

Any other kinds of data which are necessary for personal authentication are possible beside transaction data used in personal authentication device for personal authentication.

When insurance certificate number or driver's license are used to authenticate a person in a financial institution, it is possible to authenticate that the insurance certificate number or driver's license belongs to that person by storing such a number in TRM of personal authentication device.

Similarly, it is possible to use the personal authentication device in the case where authentication is carried out by personal ID number or in any case where what is needed is just to show confidential information such as amusement park annual passport, ticket used for a box seat of a baseball field, and enter/leave access control systems.

The case when personal authentication device installed on a card that is mounted in portable terminal is explained, but equivalent case when personal authentication device and portable phone are embedded in one piece, as the function corresponding to personal authentication device is embedded in a portable terminal is not considered at all.

Using fingerprint as a personal authentication is explained, but other biometrics information (biological information) such as iris, voiceprint, are also applicable.

For example, when using a voice print, an applicable form of the present invention is to use microphone as a sensor. That is, when a user starts talking through a microphone, wind pressure vibration arises which in turn generates an electric current as a trigger (supplying of power), and the structure is referred to as comparing between information detected by microphone and voiceprint collation data.

This application is based on the Japanese Patent Application No.2002-072670 filed on Mar. 15, 2002, entire content of which is expressly incorporated by reference herein.

INDUSTRIAL APPLICABILITY

The present invention is applicable to a personal authentication device used, for instant, in commercial transactions, and to a portable terminal apparatus that comprises such device and performs transactions of various types of services.

The invention claimed is:

1. A personal authentication device that is connected with a portable terminal apparatus, the personal authentication device comprising:
    a fingerprint sensor; and
    a module that authenticates an operator identity by collating stored fingerprint collation data corresponding to a fingerprint of an operator finger with fingerprint data obtained by a fingerprint sensor when the operator presses the fingerprint sensor with the operator finger, and that authorizes a transaction and transmission of confidential transaction data necessary for receiving services to outside the portable terminal apparatus by the operator's approval when the operator presses the fingerprint sensor with the operator finger,
    wherein, by a single act of pressing the fingerprint sensor by the operator finger, a switch activates the fingerprint sensor and supplies power to the fingerprint sensor, and the operator identity authentication, transaction authorization and transmission of confidential transaction data are implemented.

2. The personal authentication device according to claim 1, the module comprising:
    a tamper resistant storage area for storing the fingerprint collation data and the confidential transaction data; and
    a fingerprint collation processor that authenticates the operator identity by collating the fingerprint collation data with the fingerprint data obtained by the fingerprint sensor, wherein the fingerprint collation processor extracts the confidential transaction data from the tamper resistant storage area only when the operator identity is authenticated, and wherein the fingerprint collation processor outputs to the portable terminal apparatus the confidential transaction data and a transmission instruction to transmit the confidential transaction data to outside the portable terminal apparatus.

3. The personal authentication device according to claim 2, wherein, when the fingerprint sensor is pressed, the switch turns on, power is supplied to the tamper resistant storage area and the fingerprint collation processor is activated.

4. A portable terminal apparatus that includes the personal authentication device according to claim 2, further comprising:

a communicator that transmits the confidential transaction data output from the personal authentication device to outside the portable terminal apparatus based on the transmission instruction output from the personal authentication device.

5. The personal authentication device according to claim 2, wherein the fingerprint collation processor adds a signature by the fingerprint collation processor to the confidential transaction data to output to the portable terminal apparatus.

6. The personal authentication device according to claim 1, wherein the fingerprint sensor and the switch are positioned to at least partially overlap with each other in a direction in which pressure is increased.

7. A portable terminal apparatus that includes the personal authentication device according to claim 1, further comprising:

a communicator that transmits data output from the personal authentication device to outside the portable terminal apparatus.

8. The portable terminal apparatus according to claim 7, wherein the communicator comprises a radio communicator which operates only upon pressing the fingerprint sensor.

9. The personal authentication device according to claim 1, further comprising:

a communicator that transmits data to outside the portable terminal apparatus, wherein the module comprises:

a tamper resistant storage area for storing fingerprint collation data and the confidential transaction data; and a fingerprint collation processor that authenticates the operator identity by collating the fingerprint collation data with the fingerprint data obtained by the fingerprint sensor, and wherein the fingerprint collation processor extracts the confidential transaction data from the tamper resistant storage area only when the operator identity is authenticated and transmits the confidential transaction data to outside the portable terminal apparatus using the communicator.

10. A portable terminal apparatus that includes the personal authentication device according to claim 9.

11. The portable terminal apparatus according to claim 10, wherein the communicator comprises a radio communicator which operates only upon pressing the fingerprint sensor.

12. The personal authentication device according to claim 9, wherein the communicator comprises a radio communicator which operates only upon pressing the fingerprint sensor.

13. The personal authentication device according to claim 1, wherein the module is not activated unless the fingerprint sensor is pressed for more than a predetermined period of time.

* * * * *

UNITED STATES PATENT AND TRADEMARK OFFICE
CERTIFICATE OF CORRECTION

| | |
|---|---|
| PATENT NO. | : 7,242,277 B2 |
| APPLICATION NO. | : 10/469242 |
| DATED | : July 10, 2007 |
| INVENTOR(S) | : Atushi Minemura |

It is certified that error appears in the above-identified patent and that said Letters Patent is hereby corrected as shown below:

On the cover page at Item (54), Title, "INDIVIDUAL AUTHENTICATION DEVICE AND CELLULAR TERMINAL APPARATUS" should read --PERSONAL AUTHENTICATION DEVICE AND PORTABLE TERMINAL APPARATUS--.

Signed and Sealed this

Sixth Day of November, 2007

JON W. DUDAS
*Director of the United States Patent and Trademark Office*